United States Patent
Wang et al.

(10) Patent No.: US 12,528,136 B2
(45) Date of Patent: Jan. 20, 2026

(54) METHOD AND APPARATUS FOR ULTRASONIC WELDING THERMOPLASTIC COMPONENTS

(71) Applicant: Rohr, Inc., Chula Vista, CA (US)

(72) Inventors: Zhigang Wang, South Windsor, CT (US); Andrzej E. Kuczek, Bristol, CT (US); Wenping Zhao, Glastonbury, CT (US); John J. Gangloff, Middletown, CT (US); Justin B. Alms, Coventry, CT (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/228,477

(22) Filed: Jul. 31, 2023

(65) Prior Publication Data

US 2025/0041962 A1 Feb. 6, 2025

(51) Int. Cl.
*B23K 20/10* (2006.01)
(52) U.S. Cl.
CPC .................................. *B23K 20/10* (2013.01)
(58) Field of Classification Search
None
See application file for complete search history.

(56) References Cited

U.S. PATENT DOCUMENTS 6,955,680 B2 * 10/2005 Satou ..................... B06B 3/00
606/169
7,572,242 B2 * 8/2009 Boukhny ............ A61F 9/00745
606/169

(Continued)

FOREIGN PATENT DOCUMENTS

CN 108787407 A 11/2018
CN 208246950 U 12/2018

(Continued)

OTHER PUBLICATIONS

EP Search Report for EP Patent Application No. 24179357.9 dated Sep. 23, 2024.

(Continued)

*Primary Examiner* — Devang R Patel
(74) *Attorney, Agent, or Firm* — Getz Balich LLC (57) ABSTRACT

According to an aspect of the present disclosure, an ultrasonic welding tool having a longitudinal axis is provided that includes an ultrasonic tool, a tapered step horn, an ultrasonic transducer, and a plurality of helical grooves. The ultrasonic tool (UT) has a diameter, a UT length extending between a UT first end and a distal tool tip, and a UT exterior surface that extends around a UT circumference of the ultrasonic tool. The tapered step horn (SH) has an SH length that extends between an SH first end and an SH second end, a major diameter disposed at the SH first end, a minor diameter disposed at the SH second end, a middle diameter between the SH first end and the SH second end, and an SH exterior surface that extends around an SH circumference of the step horn. The SH second end of the step horn is connected to the UT first end of the ultrasonic tool. The ultrasonic transducer is in communication with the step horn and the ultrasonic tool. The ultrasonic transducer is controllable to ultrasonically vibrate the step horn and the ultrasonic tool. The ultrasonic tool, the step horn, and the ultrasonic transducer are disposed along the longitudinal axis. The plurality of helical grooves may be disposed in the UT exterior surface spaced apart from one another around the UT circumference, or in the SH exterior surface spaced apart from one another around the SH circumference, or both. The ultrasonic vibration caused by the ultrasonic transducer produces a composite ultrasonic vibration of the ultrasonic tool that includes a longitudinal component and a torsional component.

9 Claims, 4 Drawing Sheets

(56) References Cited

U.S. PATENT DOCUMENTS

| | | | |
|---|---|---|---|
| 7,651,490 B2 * | 1/2010 | Boukhny | A61F 9/00745 |
| | | | 606/1 |
| 11,440,131 B2 * | 9/2022 | Mitsuyuki | B29C 65/08 |
| 2019/0033264 A1 | 1/2019 | Silveira Costa Vieira | |
| 2023/0158629 A1 | 5/2023 | Wang | |
| 2024/0165735 A1 | 5/2024 | Solenthaler | |

FOREIGN PATENT DOCUMENTS

| | | | | |
|---|---|---|---|---|
| CN | 108748366 B | | 12/2023 | |
| DE | 202005003067 U1 | | 5/2005 | |
| EP | 3718647 A1 | | 10/2020 | |
| EP | 3822018 A1 | * | 5/2021 | B06B 3/00 |
| EP | 3659717 B1 | | 9/2022 | |
| JP | 2002209906 A | * | 7/2002 | |
| JP | 2013111508 A | * | 6/2013 | |
| WO | 1995023668 A1 | | 9/1995 | |
| WO | 2022194383 A1 | | 9/2022 | |

OTHER PUBLICATIONS

Third Party Observations in corresponding EP Patent Application No. 24179357.9 dated Jun. 26, 2025.
EP Office Action for EP Patent Application No. 24179357.9 dated Nov. 27, 2025.

* cited by examiner

METHOD AND APPARATUS FOR ULTRASONIC WELDING THERMOPLASTIC COMPONENTS

This invention was made with government support under W911NF-17-3-0004 awarded by the Air Force Research Laboratory (AFRL). The government has certain rights in the invention.

BACKGROUND OF THE INVENTION

1. Technical Field

The present disclosure relates to methods and apparatus for joining thermoplastic composite components together.

2. Background Information

Ultrasonic welding (UW) utilizes high frequency ultrasonic vibrations (usually at 20-40 kHz) and applied pressure to join two materials quickly and securely, without the need of a large amount of heat as is used in many traditional welding processes. Ultrasonic welding has some key advantages to material processing: lower energy consumption, reduced process cost, and reduced cycle time. The ultrasonic energy for welding is mainly used for thermal softening, and experimental results reveal that the ultrasonic energy required to produce an identical amount of softening is much less than the required thermal energy.

A typical ultrasonic tooling system that includes a transducer, a booster, a horn, and a tool. The electrical energy input to the transducer is converted to mechanical vibrations along a longitudinal axis at high frequency (usually at 20-40 kHz). The excited vibration is subsequently transmitted through an energy-focusing horn to amplify the vibration amplitude and finally delivered to the tip of the tool. Thus, the tool, which locates directly above the workpiece, can vibrate along its longitudinal axis with a desired amplitude. The tool applies pressure on the components to be welded, together with an ultrasonic vibration having an amplitude typically in the range of 2.5 to 250 μm (peak-to-peak). The heat generated by the ultrasonic vibration produces the welding energy. A consolidation phase follows the welding phase to create the desired bond. There are limitations and disadvantages associated with conventional ultrasonic welding. What is needed is a method and system for ultrasonic welding that is an improvement over existing methods and systems.

SUMMARY

According to an aspect of the present disclosure, an ultrasonic welding tool having a longitudinal axis is provided that includes an ultrasonic tool, a tapered step horn, an ultrasonic transducer, and a plurality of helical grooves. The ultrasonic tool (UT) has a diameter, a UT length extending between a UT first end and a distal tool tip, and a UT exterior surface that extends around a UT circumference of the ultrasonic tool. The tapered step horn (SH) has an SH length that extends between an SH first end and an SH second end, a major diameter disposed at the SH first end, a minor diameter disposed at the SH second end, a middle diameter between the SH first end and the SH second end, and an SH exterior surface that extends around an SH circumference of the step horn. The SH second end of the step horn is connected to the UT first end of the ultrasonic tool. The ultrasonic transducer is in communication with the step horn and the ultrasonic tool. The ultrasonic transducer is controllable to ultrasonically vibrate the step horn and the ultrasonic tool. The ultrasonic tool, the step horn, and the ultrasonic transducer are disposed along the longitudinal axis. The plurality of helical grooves may be disposed in the UT exterior surface spaced apart from one another around the UT circumference, or in the SH exterior surface spaced apart from one another around the SH circumference, or both. The ultrasonic vibration caused by the ultrasonic transducer produces a composite ultrasonic vibration of the ultrasonic tool that includes a longitudinal component and a torsional component.

In any of the aspects or embodiments described above and herein, the plurality of helical grooves may include at least three helical grooves and less than nine helical grooves.

In any of the aspects or embodiments described above and herein, each helical groove may have an arcuately shaped cross-sectional geometry, and that arcuately shaped cross-sectional geometry may be parti-circular.

In any of the aspects or embodiments described above and herein, each helical groove within the ultrasonic tool may have a depth distance that is about twenty percent of the ultrasonic tool diameter, and each helical groove within the tapered step horn may have a depth distance that is about twenty percent of the step horn middle diameter.

In any of the aspects or embodiments described above and herein, each helical groove within the ultrasonic tool may have a first end disposed in close proximity to the SH second end of the step horn, and each such groove may helically extend a length from the first end towards the distal tool tip that is at least fifty percent of the UT length.

In any of the aspects or embodiments described above and herein, each helical groove within the ultrasonic tool may include a first end and a distal end, the distal end being opposite the first end, wherein the first end may be disposed in close proximity to the SH second end of the step horn, and that respective groove may helically extend a length between the first end and the distal end, and the distal end of that respective helical groove may be longitudinally spaced apart from the distal tool tip by a separation distance that is less than the length of the helical groove.

In any of the aspects or embodiments described above and herein, the ultrasonic tool may be a solid structure.

In any of the aspects or embodiments described above and herein, each helical groove within the step horn may helically extends a length between the SH first end and the SH second end, and the length of the plurality of helical grooves is at least fifty percent of the SH length.

In any of the aspects or embodiments described above and herein, the step horn may be a solid structure.

According to an aspect of the present disclosure, a method of welding a pair of thermoplastic composite components along a continuous welding seam is provided. The method includes providing an ultrasonic welding tool having a longitudinal axis, the ultrasonic welding tool including an ultrasonic tool, a tapered step horn, an ultrasonic transducer, and a plurality of helical grooves. The ultrasonic tool (UT) has a diameter, a UT length extending between a UT first end and a distal tool tip, and a UT exterior surface that extends around a UT circumference of the ultrasonic tool. The tapered step horn (SH) has an SH length that extends between an SH first end and an SH second end, a major diameter disposed at the SH first end, a minor diameter disposed at the SH second end, a middle diameter between the SH first end and the SH second end, and an SH exterior surface that extends around an SH circumference of the step horn. The SH second end of the step horn is connected to the UT first end of the ultrasonic tool. The ultrasonic transducer is in communication with the step horn and the ultrasonic tool. The ultrasonic transducer is controllable to ultrasonically vibrate the step horn and the ultrasonic tool. The ultrasonic tool, the step horn, and the ultrasonic transducer are disposed along the longitudinal axis. The plurality of helical grooves may be disposed in the UT exterior surface spaced apart from one another around the UT circumference, or in the SH exterior surface spaced apart from one another around the SH circumference, or both. The ultrasonic vibration caused by the ultrasonic transducer produces a composite ultrasonic vibration of the ultrasonic tool that includes a longitudinal component and a torsional component. The method further includes: controlling the ultrasonic welding tool to produce the composite ultrasonic vibration of the ultrasonic tool, and translating the ultrasonic tool relative to the pair of thermoplastic composite components, or translating the pair of thermoplastic composite components relative to the ultrasonic tool, or some combination thereof, to produce the continuous welding seam.

In any of the aspects or embodiments described above and herein, the step of controlling may include controlling the ultrasonic welding tool to produce the composite ultrasonic vibration of the ultrasonic tool in a manner that produces a sliding motion between the ultrasonic tool and the pair of thermoplastic composite components in a direction coincident with the continuous welding seam.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
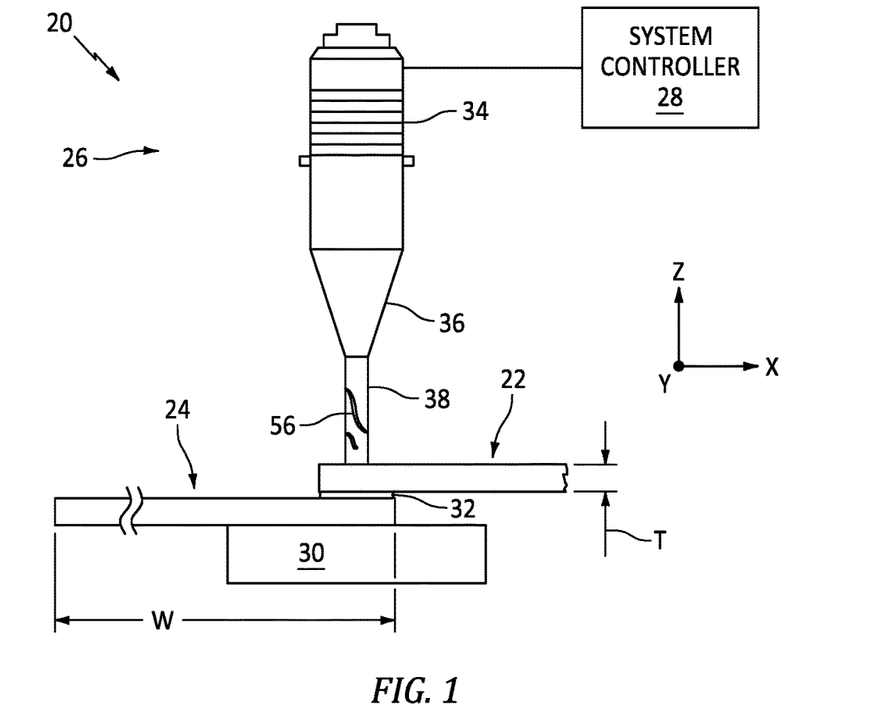
FIG. 1 is a diagrammatic view of a present disclosure ultrasonic welding tool system embodiments and thermoplastic components.
Figure 2:
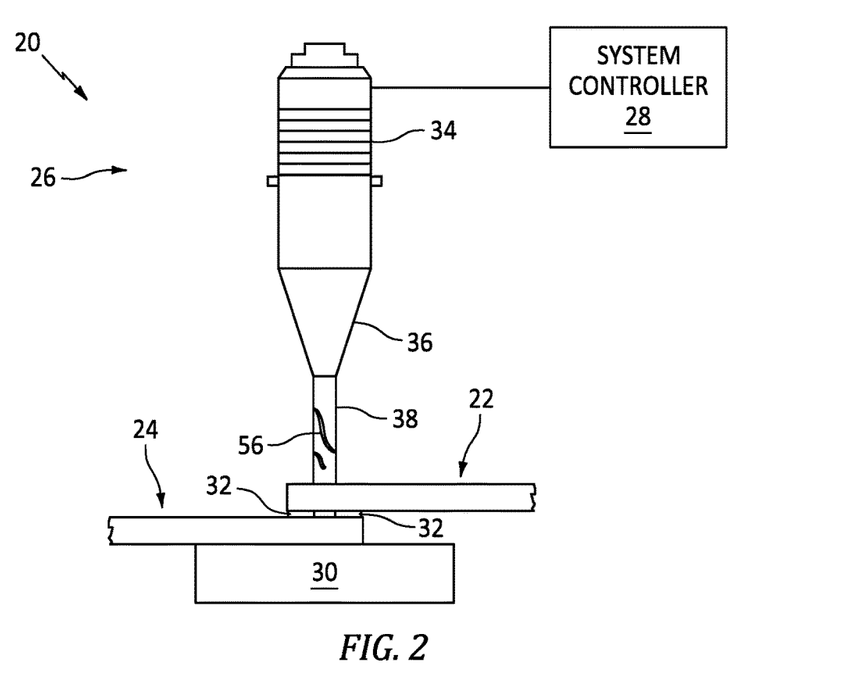
FIG. 2 is a diagrammatic view of a present disclosure ultrasonic welding tool system embodiments and thermoplastic components.

Referring to FIGS. 1 and 2, the present disclosure is directed to a system 20 and method for joining components (e.g., a first component panel 22 and a second component panel 24 as will be detailed herein) that comprise one or more thermoplastic composite (TPC) materials. The system 20 includes an ultrasonic welding tool 26. In some embodiments, the present disclosure system 20 may also include a system controller 28 and/or a stationary anvil 30 disposed on the side of the components opposite the ultrasonic welding tool 26. The present disclosure does not require a system controller or an anvil.

Examples of thermoplastic materials that may be included within a TPC material (e.g., as a matrix material or the like) include polyaryletherketone (PAEK), polyetheretherketone (PEEK), polyetherketoneketone (PEKK), polyetherimide (PEI), perfluoroalkopxy (PFA), polytetrafluoroethylene (PTFE), polyphenylene sulfide (PPS), and polyamide (PA—"nylon"), and variations and/or combinations thereof. The present disclosure is not limited to use with any particular TPC material.

The present disclosure is not limited to joining components comprising any particular TPC material. For example, each of the components 22, 24 to be joined may comprise the same TPC material(s) or may comprise different TPC materials; e.g., a first component comprising a first TPC material, a second component comprising a second TPC material that is different from the first TPC material, and so on. As another example, the present disclosure may be used to join components that comprise a homogenous TPC material, or components that include a plurality layers of different TPC materials, or the like.

In some embodiments, the present disclosure may be used to join TPC components with an interface layer 32 disposed between the TPC components. The interface layer 32 may be a single (i.e., unitary) body that is disposed throughout a bond region (e.g., see FIG. 1), or it may be a plurality of independent segments (e.g., strips) disposed within the bond region (e.g., see FIG. 2). The interface layer 32 comprises at least one type of thermoplastic material. The interface layer 32 may have a homogenous configuration (e.g., the same thermoplastic material throughout), or it may include a fibrous material distributed within a thermoplastic material matrix (e.g., discontinuous fibers), or it may include a plurality of sublayers with different materials. A non-limiting example of an interface layer 32 with a plurality of sub-layers is one that includes a sub-layer comprising a mesh material, or a cloth material, or a screen material, or a layer of continuous fibers, or the like. Non-limiting examples of fiber material include ceramic, glass, metal, carbon, and the like. As stated above, the present disclosure does not require an interface layer 32 disposed between the components to be joined. That said, it is understood that a significant portion of frictional dissipation at the interface between the interface layer 32 and the components to be joined may result from relative motion therebetween. Hence, an interface layer 32 may improve surface frictional heat generation, which in turn can facilitate bonding. In addition, an interface layer 32 that possesses a compressive stiffness lower than that of the components to be joined can facilitate localization of the bonding energy and further improve the joining process.

FIGS. 1 and 2 diagrammatically illustrate the first and second components configured as a first component panel 22 and a second component panel 24 to facilitate the description herein; e.g., panels having a thickness ("T"; Z-axis), a width ("W"; X-axis), and a length (perpendicular to the page; Y-axis), wherein the thickness is substantially less than width or length. The present disclosure is not limited to joining components having any particular configuration. However, the present disclosure provides great utility in joining components configured as panels; e.g., aircraft components such as fins, control surfaces, stabilizers, and the like.

Figure 3:
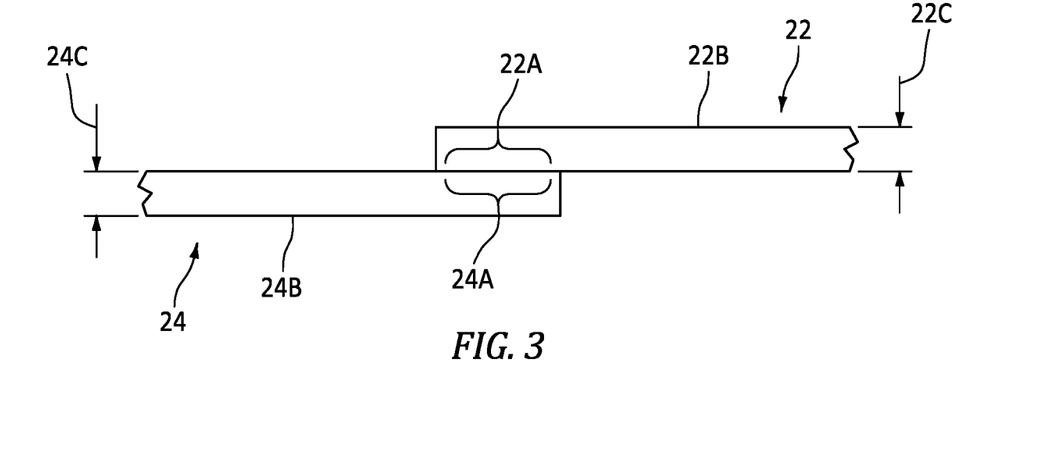
FIG. 3 is a diagrammatic view of thermoplastic components to be joined.
Figure 4:
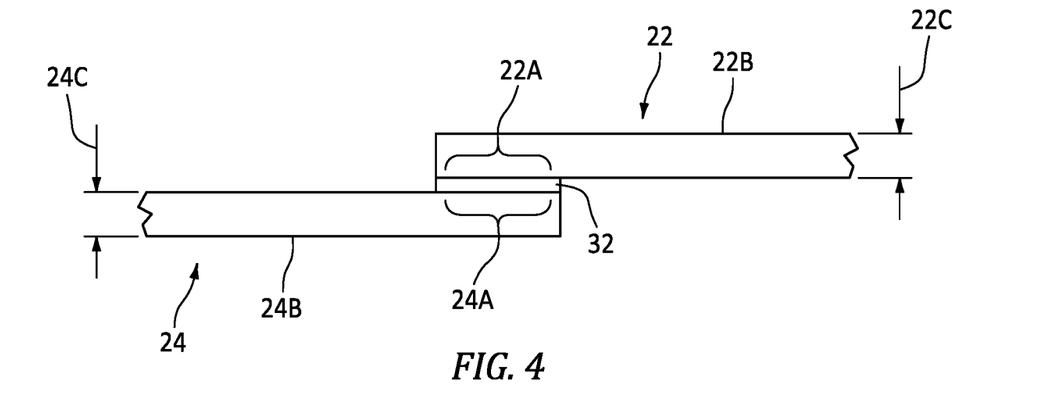
FIG. 4 is a diagrammatic view of thermoplastic components to be joined.

Referring to FIGS. 3 and 4, the surface portion of the first component panel 22 (FCP) aligned for bonding may be referred to herein as the FCP bonding surface 22A. The surface portion of the second component panel 24 (SCP) aligned for bonding may be referred to herein as the SCP bonding surface 24A. The first component panel 22 includes an FCP outer surface 22B opposite the FCP bonding surface 22A and a FCP thickness 22C that extends therebetween. The second component panel 24 includes an SCP outer surface 24B opposite the SCP bonding surface and a thickness 24C that extends therebetween. In those embodiments that do not utilize an interface layer 32 (e.g., see FIG. 3), the FCP bonding surface 22A and the SCP bonding surface 24A are disposed in contact with one another prior to bonding. In those embodiments that utilize an interface layer 32 (e.g., see FIG. 4), the interface layer 32 is disposed between the FCP bonding surface 22A and the SCP bonding surface 24A.

Figure 5:
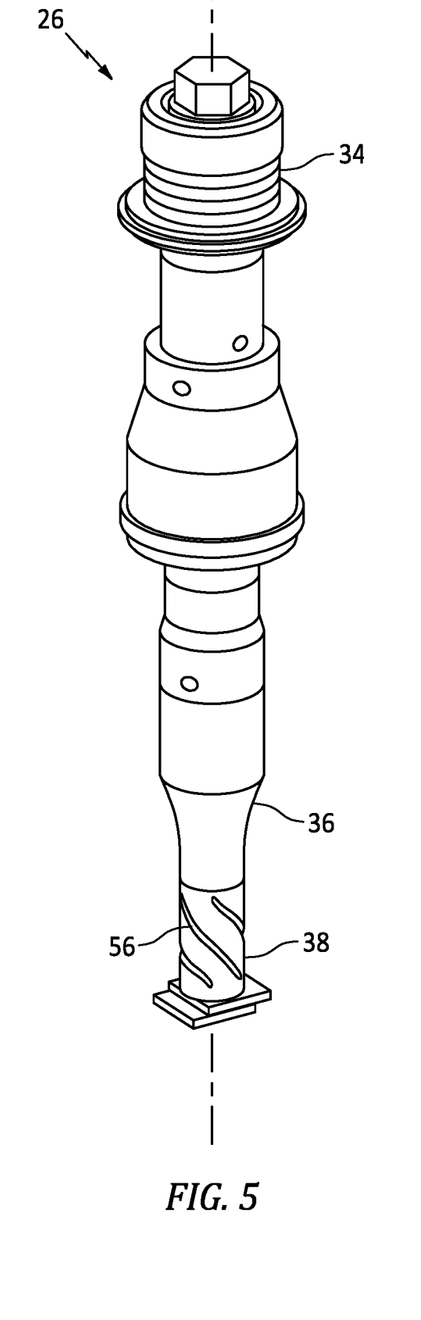
FIG. 5 is a diagrammatic view of a present disclosure ultrasonic welding tool embodiment.
Figure 5A:
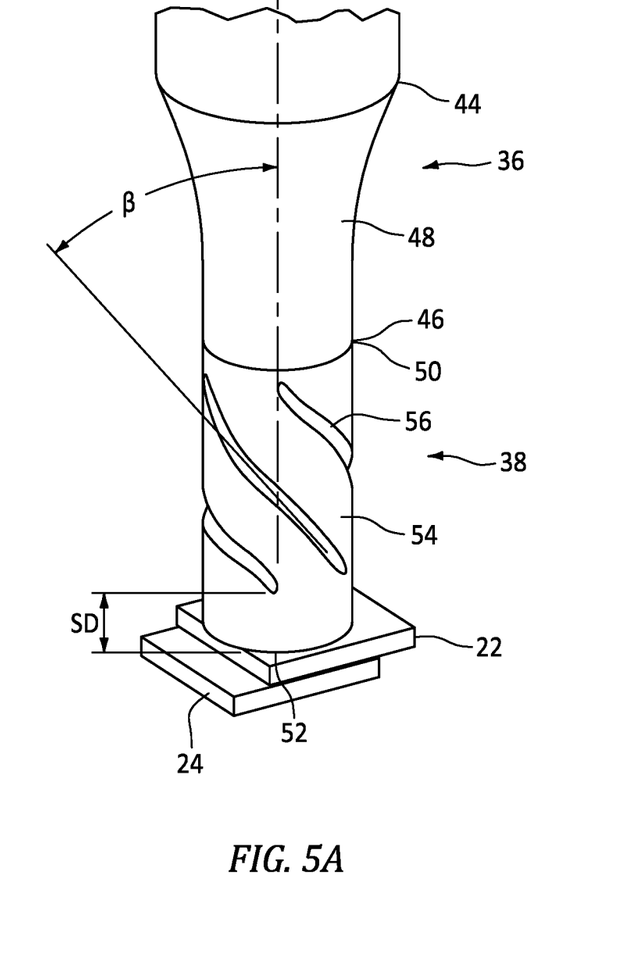
FIG. 5A is an enlarged view of a portion of the present disclosure ultrasonic welding tool embodiment shown in FIG. 5.
Figure 6:
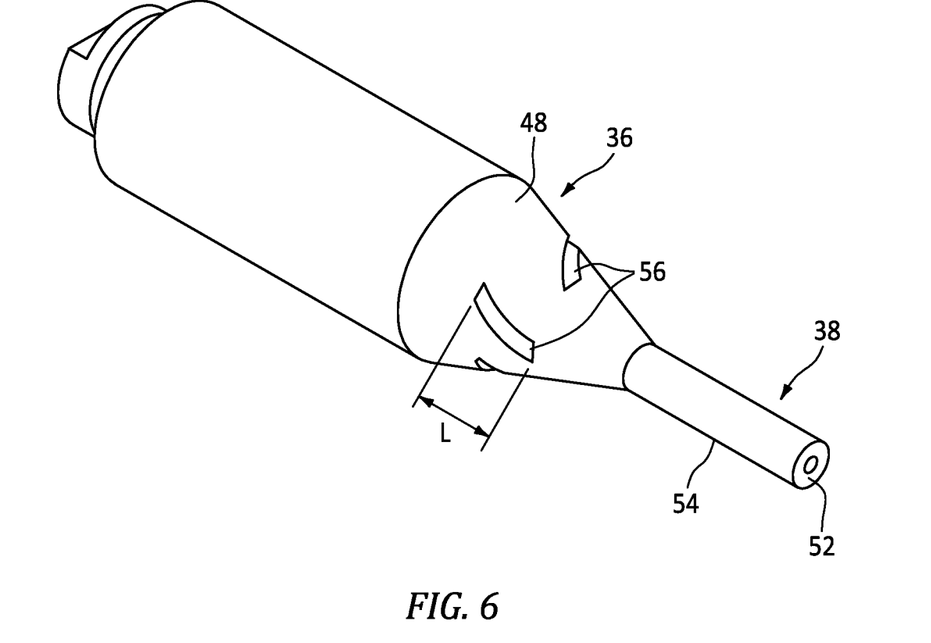
FIG. 6 is a diagrammatic view of a portion of a present disclosure ultrasonic welding tool embodiment.

FIGS. 5 and 5A illustrate a present disclosure ultrasonic welding tool 26 embodiment. FIG. 5A is an expanded view of a portion of the ultrasonic welding tool 26 embodiment shown in FIG. 5. FIG. 6 diagrammatically illustrates a portion of an alternative present disclosure ultrasonic welding tool 26 embodiment. The ultrasonic welding tool 26 embodiment shown in FIG. 5 includes a transducer 34, a step horn 36, and an ultrasonic tool 38 disposed along a longitudinal axis 40. The step horn 36 may have a tapered configuration (e.g., a conical or generally conical configuration), extending longitudinally between a first end 44 and a second end 46, the step horn 36 having a major diameter disposed at the first end 44, a minor diameter disposed at the second end 46, and a middle diameter between the first end 44 and the second end 46. The step horn 36 has an exterior surface 48 that extends longitudinally between the first end 44 and the second end 46 and around a circumference of the step horn 36. The ultrasonic tool 38 may be cylindrically shaped, extending longitudinally between a first end 50 and a distal second end 52 (also referred to as the tool tip 52). The ultrasonic tool 38 has an exterior surface 54 that extends longitudinally between the first end 50 and the tool tip 52 and around a circumference of the ultrasonic tool 38. A power supply (not shown) provides high frequency electrical signals to the transducer 34. The transducer 34 in turn converts high-frequency electricity into high-frequency (ultrasonic) vibrations. The step horn 36 focuses the ultrasound vibrations and delivers them to the ultrasonic tool 38 and the ultrasonic tool 38 in turn delivers the ultrasonic vibrations to the components to be joined.

The ultrasonic welding tool 26 embodiments shown in FIGS. 5, 5A and 6 include a plurality of helical grooves 56. The helical grooves 56 may be disposed in the exterior surface 54 of the ultrasonic tool 38 portion of the ultrasonic welding tool 26 (e.g., see FIGS. 5 and 5A), or in the exterior surface 48 of the step horn 36 portion of the ultrasonic welding tool 26 (e.g., see FIG. 6), or both. The present disclosure is not limited to any particular number of helical grooves 56 other than two or more. Our analysis indicates that a number of helical grooves 56 in the range of three to eight (3-8) helical grooves 56 works well for most ultrasonic welding tool 26 embodiments. The plurality of helical grooves 56 may be uniformly spaced relative to one another around the circumference of the respective portion of the ultrasonic welding tool 26; e.g., an embodiment having four (4) helical grooves 56 may have the grooves 56 circumferentially spaced ninety degrees (90°) apart from one another.

Figure 7:
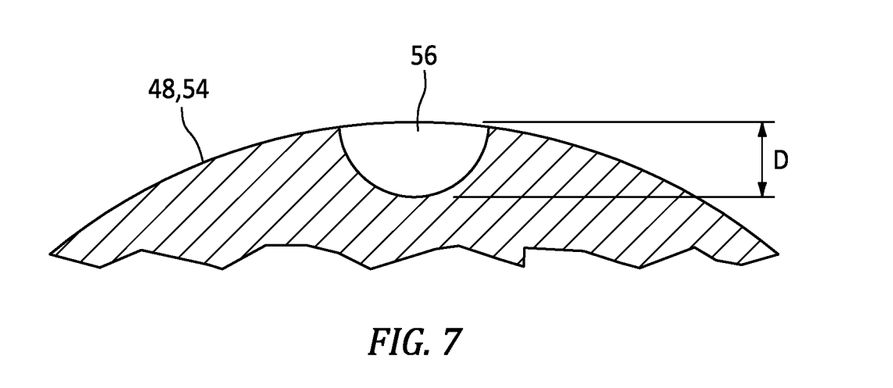
FIG. 7 is a diagrammatic sectional view illustrating a present disclosure helical groove.

The helical grooves 56 are disposed at an angle ("β") in the range of about thirty to sixty degrees (30°-60°) relative to the longitudinal axis of the ultrasonic welding tool 26; e.g., see FIG. 5A. The helical grooves 56 typically extending a depth distance ("D"—see FIG. 7) from the exterior surface 48, 54 that is about fifteen to twenty five (15-25%) of the radius of the structure in which it is disposed; e.g., the step horn 36 or the ultrasonic tool 38. The depth distance "D" is from the deepest point of the helical groove 56 to the exterior surface 48, 54. In the case of the tapered configuration step horn 36, the helical slot depth distance ("D") from the exterior surface 48 is about fifteen to twenty five (15-25%) of the radius of the step horn 36 at the longitudinal middle of the step horn 36. Our analysis indicates that a helical slot depth distance ("D") from the exterior surface 48, 54 at about twenty percent (20%) of the radius of the structure in which it is disposed works well. The ultrasonic tool 38 portion and the step horn 36 portion of the present disclosure ultrasonic welding tool 26 may be configured as a solid structure other than the aforesaid helical grooves 56. The FIGURES diagrammatically illustrate the helical grooves 56 as having a parti-circular cross-sectional geometry. The helical grooves 56 are not limited to having a parti-circular cross-sectional geometry; e.g., alternative cross-sectional geometries that may be used include elliptical geometries, oval geometries and other arcuate cross-sectional geometries. The longitudinal length ("L") of the helical grooves 56 (e.g., see FIG. 6) can be selected to suit the application at hand. In the embodiment diagrammatically shown in FIG. 5A, the helical grooves 56 extend a distance "L" around the circumference of the ultrasonic tool 38 from about the intersection between the step horn 36 and the ultrasonic tool 38 to a separation distance ("SD") from the tool tip 52. In other words, a first end of each helical groove 56 is disposed in close proximity to the second end 46 of the step horn 36. In the embodiment shown in FIGS. 5 and 5A the separation distance "SD" is substantially less than the length "L" of the grooves 56; e.g., the separation distance SD may be limited to a length "SD" sufficient to avoid undesirable stress concentrations at or in close proximity to the tool tip 52. Also in the embodiment shown in FIGS. 5 and 5A, the helical grooves 56 extend a distance "L" that is greater than fifty percent (50%) of the axial length of the ultrasonic tool (i.e., the axial length of the ultrasonic tool 38 between the first end 50 of the ultrasonic tool 38 and the tool tip 52). The embodiment shown in FIGS. 5 and 5A is understood to perform particularly well in a continuous welding seam process wherein the ultrasonic welding tool 26 is moved relative to thermoplastic components 22, 24 or vice versa. In the embodiment diagrammatically shown in FIG. 6, the helical grooves 56 extend around the circumference of the step horn 36 a distance "L" that may be at least about fifty percent (50%) or more of the distance between the first and second ends 44, 46 of the step horn 36. As will be detailed herein, it is understood that the helical grooves 56 extending in a helical direction around the step horn 36 or ultrasonic tool 38 desirably convert a higher percentage of a longitudinal excitation wave to a torsional vibration component than is possible with a straight line groove.

In those present disclosure system 20 embodiments that include a system controller 28, the system controller 28 is in communication with other components within the system 20, including the ultrasonic welding tool 26. The system controller 28 may be in communication with these components to control and/or receive signals therefrom to perform the functions described herein. The system controller 28 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 20 to accomplish the same algorithmically and/or coordination of system components. The system controller 28 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The system controller 28 may include, or may be in communication with, an input device that enables a user to enter data and/or instructions, and may include, or be in communication with, an output device configured, for example to display information (e.g., a visual display device as indicated above or a printer), or to transfer data, etc. Communications between the system controller 28 and other system components may be via a hardwire connection or via a wireless connection.

Conventional ultrasonic welding tools having a vibrational axis perpendicular to the joining components often operate in a linear vibration mode; e.g., the transducer causes the distal portion of the ultrasonic welding tool to ultrasonically vibrate (i.e., reciprocal motion) along the longitudinal axis of the ultrasonic welding tool. Hence, the welding occurs solely in a direction aligned with the longitudinal axis. During use, the tip of the tool portion of conventional ultrasonic welding tools may exhibit some degree of torsional movement, but such torsional movement is on a scale that it does not appreciable contribute to the welding process. During use, the tool portion of conventional ultrasonic welding tools may also exhibit undesirable bending modes. The linear ultrasonic vibration (parallel to the longitudinal axis) generates heat as a result of friction and viscoelastic response at the interface between components to be joined. To the extent that the linear ultrasonic vibration produced by a conventional device includes torsional mode vibration at the tool tip, that torsional mode vibration does not appreciably contribute to the heat generation.

In contrast, the present disclosure ultrasonic welding tool 26 with helical grooves 56 produces a composite ultrasonic vibration that includes a longitudinal component throughout the ultrasonic tool 38 portion and a torsional component, the latter being large enough to produce appreciable torsional vibration at the tool tip 52; i.e., rotational movement of the tool tip 52. Our analysis suggests that present disclosure ultrasonic welding tools 26 with helical grooves 56 may produce up to ten times (10×) the amount of torsional mode vibration at the tool tip 52 than is produced by a comparable ultrasonic welding tool without the aforesaid helical slots. The torsional mode vibration at the tool tip 52 is understood to improve surface heat generation and to mitigate undesirable bending modes. In addition, the torsional mode vibration produced by the present disclosure (and its groove configurations as described herein) acts as a sliding motion, which is understood to provide a significant benefit when the present disclosure ultrasonic welding tool 26 is used to produce a continuous welding seam between thermoplastic components 22, 24. For example, the torsional mode vibration provides a sliding motion which helps to smooth the welding area and facilitates movement between the ultrasonic tool 36 portion of the ultrasonic welding tool 26 and the thermoplastic components 22, 24 being joined along a continuous seam.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An ultrasonic welding tool having a longitudinal axis, comprising:
   an ultrasonic tool (UT) having a diameter, a UT length that extends between a UT first end and a distal tool tip, and a UT exterior surface that extends around a UT circumference of the ultrasonic tool;
   a tapered step horn (SH) having an SH length that extends between a SH first end and a SH second end, a major diameter disposed at the SH first end, a minor diameter disposed at the SH second end, a middle diameter between the SH first end and the SH second end, and an SH exterior surface that extends around a SH circumference of the step horn, and wherein the SH second end of the step horn is connected to the UT first end of the ultrasonic tool;
   an ultrasonic transducer in communication with the step horn and the ultrasonic tool, the ultrasonic transducer is controllable to ultrasonically vibrate the step horn and the ultrasonic tool, wherein the ultrasonic tool, the step horn, and the ultrasonic transducer are disposed along the longitudinal axis;
   a plurality of helical grooves disposed in the UT exterior surface spaced apart from one another around the UT circumference; and
   a plurality of second helical grooves disposed in the SH exterior surface spaced apart from one another around the SH circumference;
   wherein the ultrasonic vibration caused by the ultrasonic transducer produces a composite ultrasonic vibration of the ultrasonic tool that includes a longitudinal component and a torsional component.

2. An ultrasonic welding tool having a longitudinal axis, comprising:
   an ultrasonic tool (UT) having a diameter, a UT length extending between a UT first end and a distal tool tip, and a UT exterior surface that extends around a UT circumference of the ultrasonic tool;
   a tapered step horn (SH) having an SH length that extends between a SH first end and a SH second end, a major diameter disposed at the SH first end, a minor diameter disposed at the SH second end, a middle diameter between the SH first end and the SH second end, and an SH exterior surface that extends around a SH circumference of the step horn, and wherein the SH second end of the step horn is connected to the UT first end of the ultrasonic tool;
   an ultrasonic transducer in communication with the step horn and the ultrasonic tool, the ultrasonic transducer is controllable to ultrasonically vibrate the step horn and the ultrasonic tool, wherein the ultrasonic tool, the step horn, and the ultrasonic transducer are disposed along the longitudinal axis; and
   a plurality of helical grooves disposed in the SH exterior surface spaced apart from one another around the SH circumference;
   wherein the ultrasonic vibration caused by the ultrasonic transducer produces a composite ultrasonic vibration of the ultrasonic tool that includes a longitudinal component and a torsional component; and
   wherein each said helical groove of the plurality of helical grooves helically extends a length between the SH first end and the SH second end, and the length of each said helical grove of the plurality of helical grooves is at least fifty percent of the SH length.

3. The ultrasonic welding tool of claim 2, wherein the plurality of helical grooves includes at least three said helical grooves and less than nine said helical grooves.

4. The ultrasonic welding tool of claim 2, wherein each said helical groove of the plurality of helical grooves has an arcuately shaped cross-sectional geometry.

5. The ultrasonic welding tool of claim 4, wherein each said helical groove of the plurality of helical grooves has a partial-circular shaped cross-sectional geometry.

6. The ultrasonic welding tool of claim 5, wherein each helical groove of the plurality of helical grooves has a depth distance that is about twenty percent of the step horn middle diameter.

7. The ultrasonic tool welding tool of claim 2, wherein the step horn is a solid structure.

8. A method of welding a pair of thermoplastic composite components along a continuous welding seam, comprising:
   providing the ultrasonic welding tool according to claim 1;
   controlling the ultrasonic welding tool to produce the composite ultrasonic vibration of the ultrasonic tool; and
   translating the ultrasonic tool relative to the pair of thermoplastic composite components, or translating the pair of thermoplastic composite components relative to the ultrasonic tool, or some combination thereof, to produce the continuous welding seam.

9. The method of claim 8, wherein the step of controlling includes controlling the ultrasonic welding tool to produce the composite ultrasonic vibration of the ultrasonic tool in a manner that produces a sliding motion between the ultrasonic tool and the pair of thermoplastic composite components in a direction coincident with the continuous welding seam.

* * * * *